Figure 1:
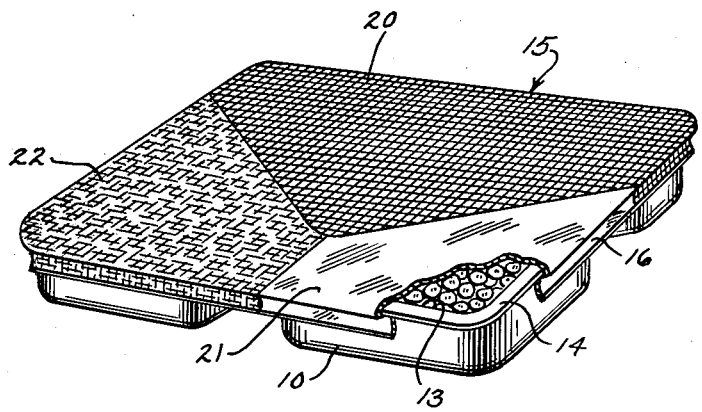

March 5, 1963 M. E. GRIEM 3,079,912
COMPARTMENTED CONTAINER ARRANGED TO SIMULTANEOUSLY HEAT
FOOD IN THE VARIOUS SECTIONS AT DIFFERING HEAT RATES
Filed Oct. 27, 1960

INVENTOR
MILTON E. GRIEM

BY

ATTORNEY

United States Patent Office 3,079,912
Patented Mar. 5, 1963

3,079,912
COMPARTMENTED CONTAINER ARRANGED TO SIMULTANEOUSLY HEAT FOOD IN THE VARIOUS SECTIONS AT DIFFERING HEAT RATES
Milton E. Griem, Fox Point, Wis., assignor to Milprint, Inc., Milwaukee, Wis., a corporation of Delaware
Filed Oct. 27, 1960, Ser. No. 65,325
3 Claims. (Cl. 126—390)

The present invention relates to commodity containers, and in particular, to compartmented commodity containers which may be adapted for containing a variety of commodities, such as food courses comprising a meal and including an entree, vegetable and potatoes, or rice, and wherein the commodities contained within the compartments for some reason, such as the composition thereof and/or bulk, require heating to differing temperature gradients, and wherein the entire container is to be heated as a closed unit in an oven or the like wherein the ambient temperature affecting the container will be the same for all portions thereof.

The present invention contemplates the provision of a container having compartmented sections which are respectively arranged to contain a selected edible or other commodity wherein the commodity, such as food is adapted to be prepared by heating the same prior to serving, and wherein the container includes portions thereof forming wall surfaces (which may comprise areas of a removable lid) for each of the sections, which portions are normally of heat-reflective material, and wherein selected exterior surface areas of the portions adjacent respective ones of the compartmented sections are respectively coated with heat-absorbent materials selected to effect desired radiant heat transmission characteristics to a particular section, and wherein the said characteristics will differ from area to area.

It is an object of the present invention to accomplish the desired foregoing results by coating or otherwise covering selected adjacent wall portions with a material having differing heat, absorbent characteristics than that of an adjacent section.

A specific object of the present invention is to provide a lid for a compartmented container wherein certain defined areas thereon, corresponding to commodity-containing compartments of said container adjacent said areas, will selectively transmit heat interiorly thereof when the entire container is placed in an oven or the like at a desired temperature affecting the lid-enclosing container as a whole.

Another specific object of the present invention is to provide a compartmented container in which a variety of foods may be separately placed in the respective compartments thereof and may be frozen, held, transported and reheated, and wherein a cover for the said container or a selected area thereof adjacent a respective compartment of the container may be painted or otherwise coated to provide certain heat-absorbing characteristics transmitted inwardly to the particular compartmented food when the said container is reheated as a unit in an oven or the like at a selected temperature.

More particularly, it is an object of the present invention to coat the said container or cover for the same with materials of differing colors or other characteristics effecting the heat-absorbent qualities of respective portions thereof.

Figure 2:
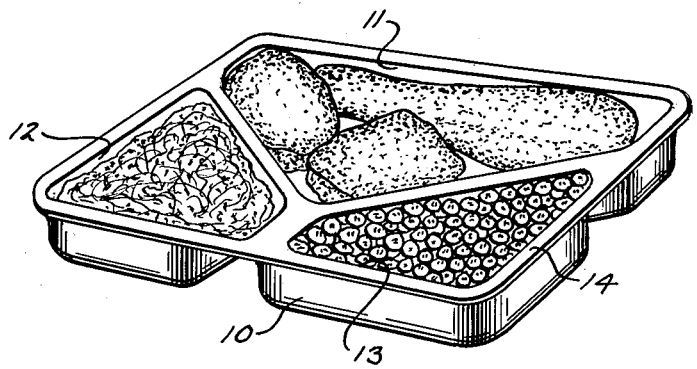
Figure 3:
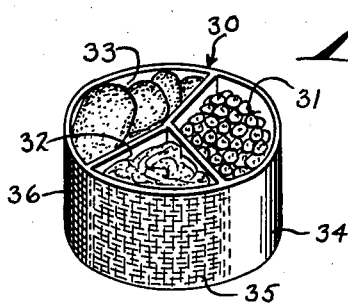

Referring now to the drawing:

FIG. 1 is a perspective view of a compartment food container embodying the present invention, and so constructed as to include a removable lid having areas thereon coated with materials of differing heat-absorbent characteristics, said areas being of a configuration substantially identical to that defined by the adjacent compartment of the container;

FIG. 2 is a perspective view of the container with the aforementioned lid removed and illustrating differing meal serving courses contained in the several compartments; and FIG. 3 is a perspective view illustrative of a compartmented container, with the lid removed, wherein the body of the container is coated with heat-absorbent material differing in characteristics with selected adjacent areas defining one wall of a respective compartment.

With reference to FIGS. 1 and 2 of the drawing, it will be apparent that the present invention may be readily embodied in conventional type containers for individual meal servings wherein a container 10 is sectioned off to provide separate compartments 11, 12 and 13, which may, for purposes of illustration, contain an entree, a potato course and a vegetable, respectively. The containers 10 are of the type presently available and are generally of fabricated aluminum sheet stampings with continuous rolled or beaded top marginal edges 14.

With particular reference to FIG. 1, it will be noted that the container 10 is provided with a removable lid denoted generally by the reference numeral 15, and embodying the teachings of the present invention. The lid 15 is preferably adapted to include an overhanging marginal edge 16 which is arranged for crimping or pressed engagement with the marginal edge 14 of the compartmented container 10. Thus, the commodities may be placed in the respective sectioned compartments 11, 12 and 13 by the processor and the lid 15 fastened in place. In the case of food, it is often desirable to precook the food and place it in the container and cover the same prior to freezing. The entire covered container is then maintained at or below freezing temperature until the purchaser is ready to consume the contents. As is often the case, the container, with the frozen goods is placed directly in an oven while the goods are in frozen state and heated for a given length of time to defrost the food and to warm it to eating temperature. In the past, the food in the respective compartments has been unevenly heated unless it was left in the oven for an extended period at elevated temperature. Very often, in order to bring the entree, for instance, to desired eating temperature, the more delicate vegetable would be overcooked and even charred. If the period was reduced the bulkier items would be underheated.

The present invention overcomes the former difficulties and contemplates a modification of the container to accomplish the same. The lid 15, or other portion of the container, as will hereinafter be explained, which may be coated or colored by means of printing, painting, dyeing or other means at certain sections or areas corresponding to the sectioned compartments 11, 12 and 13 of the container 10. That is, the area identified by the reference numeral 20, which corresponds to the compartment 11, may be printed or painted black for the ultimate in heat-absorbing characteristics in the case of an entree, as contrasted with the area 21 corresponding to the compartment 13, which is uncoated to provide the other extreme in heat-reflective properties. The lid area 22, corresponding to the compartment 12 is selected to be, for purposes of illustration, of an intermediate heat-absorbing material, such as a yellow colored printing ink. It is to be noted that the areas 20 and 22 are, in the preferred embodiment, of solid opaque color and have been, for the purposes of illustration only, defined by means of conventional Patent Office color symbols.

Tests have been conducted to bring forth the pronounced attributes of the invention by enwrapping potatoes with reflective aluminum foil coated exteriorly with printing ink of selected colors and with uncoated reflective foil. Such results definitely brought forth marked distinctions in the effect of applying or not applying such coatings. Comparative tests were made with raw potatoes, suitable for baking purposes, wherein the potatoes were enwrapped in interiorly reflective aluminum foil sheets of 1½ mil thickness, which had been exteriorly coated black, yellow, and with uncoated foil with a shiny exterior, respectively. Readings were taken by means of thermocouples inserted in the center of the wrapped potatoes. The potatoes were then placed two at a time in an oven preheated to 400° F. The first comparison was run on potatoes, each weighing 190 grams using black versus yellow coated foil wrappers. Air was excluded as far as possible from inside the enwrapped potatoes, giving a very close foil wrap to them. Temperature readings were taken at one minute intervals throughout the test. These readings were as follows:

Table I

| Time | Temp. (° F.), black coated foil | Temp. (° F.), yellow coated foil | Time | Temp. (° F.), black coated foil | Temp. (° F.), yellow coated foil |
| --- | --- | --- | --- | --- | --- |
| Start | 82 | 78 | 29 | 174 | 160 |
| 1 | 83 | 80 | 30 | 177 | 163 |
| 2 | 85 | 81 | 31 | 180 | 166 |
| 3 | 86 | 82 | 32 | 182 | 169 |
| 4 | 87.5 | 84 | 33 | 185 | 172 |
| 5 | 89 | 85 | 34 | 187 | 175 |
| 6 | 92 | 87 | 35 | 190 | 178 |
| 7 | 95 | 90 | 36 | 192 | 181 |
| 8 | 98 | 92 | 37 | 194 | 183 |
| 9 | 100.5 | 94 | 38 | 196 | 185 |
| 10 | 103.5 | 97 | 39 | 198 | 187 |
| 11 | 108 | 100 | 40 | 200 | 189 |
| 12 | 112 | 104 | 41 | 201 | 190.5 |
| 13 | 115 | 107 | 42 | 202 | 192 |
| 14 | 120 | 111 | 43 | 203.5 | 193 |
| 15 | 123 | 114 | 44 | 205 | 195 |
| 16 | 127 | 117 | 45 | 206 | 196 |
| 17 | 131 | 120 | 46 | 206.5 | 198 |
| 18 | 135 | 124 | 47 | 207 | 199 |
| 19 | 139 | 127 | 48 | 208 | 201 |
| 20 | 142.5 | 130 | 49 | 208.5 | 202.5 |
| 21 | 147 | 134 | 50 | 209 | 204 |
| 22 | 151 | 137 | 51 | | 205 |
| 23 | 155 | 141 | 52 | | 206 |
| 24 | 159 | 145 | 53 | | 206.5 |
| 25 | 162 | 148 | 54 | | 207.5 |
| 26 | 164.5 | 151 | 55 | | 208 |
| 27 | 168 | 154 | 56 | | 209 |
| 28 | 171 | 157 | | | |

The second test was run with a comparison being made between black exteriorly coated and shiny foil, using potatoes that weighed 177 grams and 175 grams, respectively. These potatoes were also placed in an oven preheated to 400° F. Temperature readings were taken every minute during the test with results as follows:

Table II

| Time | Temp. (° F.), black coated foil | Temp. (° F.), shiny foil | Time | Temp. (° F.), black coated foil | Temp. (° F.), shiny foil |
| --- | --- | --- | --- | --- | --- |
| Start | 75 | 74 | 31 | 183 | 158 |
| 1 | 77 | 75 | 32 | 185.5 | 161 |
| 2 | 80 | 76 | 33 | 188 | 164 |
| 3 | 82 | 77 | 34 | 190 | 167 |
| 4 | 85 | 78 | 35 | 194 | 170 |
| 5 | 88 | 79 | 36 | 196 | 172 |
| 6 | 91 | 82 | 37 | 198 | 173.5 |
| 7 | 94 | 85 | 38 | 200 | 178 |
| 8 | 98 | 87 | 39 | 202 | 179 |
| 9 | 101 | 90 | 40 | 204 | 181.5 |
| 10 | 104 | 92 | 41 | 204.5 | 183 |
| 11 | 108 | 95.5 | 42 | 206 | 185.5 |
| 12 | 112 | 98 | 43 | 207 | 187 |
| 13 | 116 | 101 | 44 | 208 | 189 |
| 14 | 120 | 104 | 45 | 209 | 193 |
| 15 | 124 | 108 | 46 | | 194 |
| 16 | 128 | 110 | 47 | | 196 |
| 17 | 132 | 113 | 48 | | 198 |
| 18 | 136 | 116 | 49 | | 200 |
| 19 | 140 | 119.5 | 50 | | 202 |
| 20 | 144 | 122 | 51 | | 202.5 |
| 21 | 148 | 126 | 52 | | 203.5 |
| 22 | 152 | 129 | 53 | | 204.5 |
| 23 | 156 | 132 | 54 | | 205 |
| 24 | 160 | 135 | 55 | | 206 |
| 25 | 164 | 138 | 56 | | 206.5 |
| 26 | 169 | 142 | 57 | | 207 |
| 27 | 172.5 | 145 | 58 | | 208 |
| 28 | 175.5 | 149 | 59 | | 208.5 |
| 29 | 178 | 152 | 60 | | 209 |
| 30 | 181 | 155 | | | |

It will be apparent from a review of the tables that there is decided effect upon the relative heat transmission properties of foils respectively exteriorly coated with differing color variations.

The potatoes wrapped in the black foil versus the yellow foil reached a temperature of 209° F. within 50 minutes and 56 minutes, respectively, whereas the lesser weight potatoes wrapped in the black foil versus the shiny, reflective foil reached the same temperature at 45 minutes versus 60 minutes, respectively.

It will thus be observed that the heat radiated to the interior of a container may be controlled by coating a portion or portions of the container with an ink or colored lacquer of a selected color or heat transmission property, to provide variations therein depending upon that selection. Thus, a compartmented container including a variety of foods including, for instance, a relatively delicate vegetable in one compartment which may be brought to a lesser temperature by using non-coated foil. The highly reflective interior and exterior surfaces adjacent to the compartment containing the vegetable, as opposed to the surface adjacent to the entree will cause the same to be heated to a lower temperature for a given length of time. The present invention provides for the heating of a variety of commodities in a single compartmented container exposed to a common ambient temperature for the same time period by varying the exterior surface heat-absorbing characteristics.

With reference to the embodiments of FIG. 3, it will be noted that the present invention also includes the provision of providing variations in heat-absorption coatings, or elimination thereof, at wall surface portions of the container other than the lid (not shown in this figure). For instance, the container denoted generally by the reference character 30, is partitioned into compartments 31, 32 and 33, and which compartments may contain commodities requiring varying degrees of heating. Here again, the surface adjacent to each compartment may be coated or otherwise treated to provide differing heat-absorption characteristics interiorly of the container 30. For instance, the surface 34 adjacent the compartment 31, may be of a relatively high reflective nature, the portion 35 adjacent compartment 32 of the container may be of an intermediate colored coating, and the portion 36 may be coated with a highly heat-absorbent material to provide the higher relative temperature interiorly of compartment 33. A top (not shown) may be placed on the container in the usual fashion and, if desired, may be further coated with the same color as the relatively positioned container portions 34, 35 and 36.

It will be further apparent that in the case of containers manufactured of aluminum, the present invention may be embodied therein in the form of the conventional technique of anodizing and dyeing the outer surface of the container. The procedure of dyeing the various sections may take place by successive masking and coloring of areas with an acid resist coating, which may be applied by means of printing techniques. Such technique has been heretofore used for coloring certain portions of an aluminum surface and is well known to those skilled in the art.

Having described my invention, what I claim as new and useful is:

1. In a metal foil container of unitary assembly having compartmented sections respectively arranged to contain selected commodities, said commodities respectively requiring relatively differing degrees of heat treatment; the combination thereof of a removable flexible foil lid defining enclosing wall surface portions for each of said sections and being of normally heat-reflective material, the exterior surface of at least certain portions of said lid being respectively coated with a heat-absorbent material selected to effect radiant heat transmission characteristics to a respective one of said sections and differing from the characteristics transmitted by the remaining coated or non-coated portions and their respective sections.

2. In a container of unitary assembly having compartmented sections respectively arranged to contain selected commodities, said commodities respectively requiring relatively differing degrees of heat treatment; the combination therewith of a removable lid defining enclosing wall surface portions for each of said sections and being of normally heat-reflective material, the exterior surface of said lid portions being respectively coated with a heat-absorbent material selected to effect radiant heat transmission characteristics to a respective one of said sections and differing from the transmission characteristics transmitted by the remaining portions and their respective sections.

3. A removable lid for a container having compartmented sections respectively arranged to contain selected commodities and wherein said commodities require relatively differing degrees of heat treatment, said lid being of flexible, normally heat-reflective foil material and defining adjacent areas thereon corresponding to the respective compartments of said container, the exterior surface of at least certain of said portions being respectively coated with a heat-absorbent material selected to effect radiant heat transmission characteristics to a respective one of said sections and differing from the characteristics transmitted by the remaining coated or non-coated portions and their respective sections.

References Cited in the file of this patent

UNITED STATES PATENTS

| | | |
|---|---|---|
| 1,522,329 | Salucci | Jan. 6, 1925 |
| 1,553,617 | Katzinger | Sept. 15, 1925 |
| 2,331,951 | Wright et al. | Oct. 19, 1943 |
| 2,391,660 | Ward | Dec. 25, 1945 |
| 2,673,806 | Colman | Mar. 30, 1954 |
| 2,904,448 | Sorg | Sept. 15, 1959 |